Oct. 30, 1934. J. F. WAIT 1,979,126
PROCESS OF TREATING CHEMICALS AND APPARATUS THEREFOR
Filed Sept. 12, 1930 2 Sheets-Sheet 1
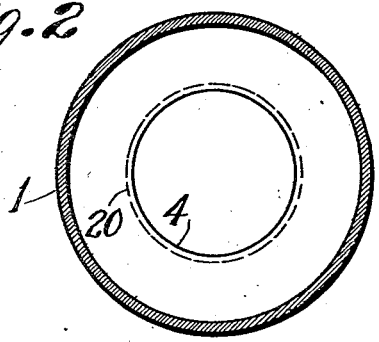
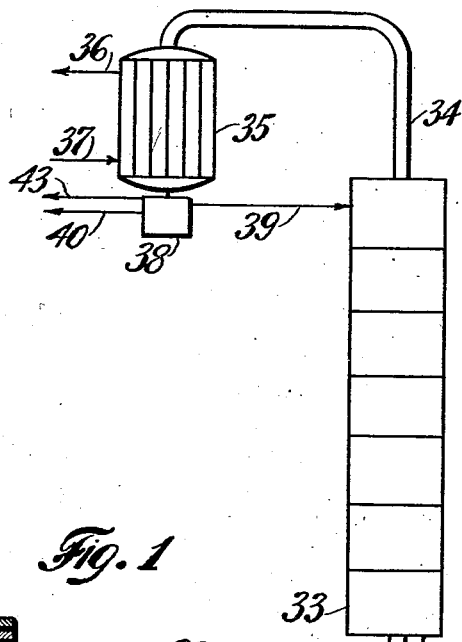
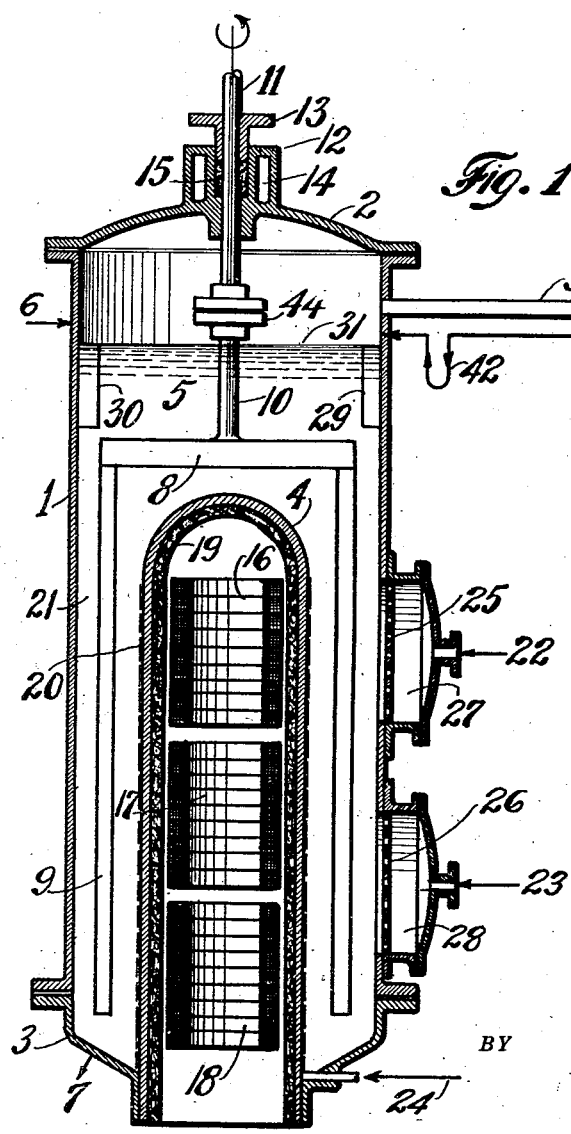
INVENTOR
Justin F. Wait
BY
ATTORNEY Oct. 30, 1934.  J. F. WAIT  1,979,126
PROCESS OF TREATING CHEMICALS AND APPARATUS THEREFOR
Filed Sept. 12, 1930  2 Sheets-Sheet 2
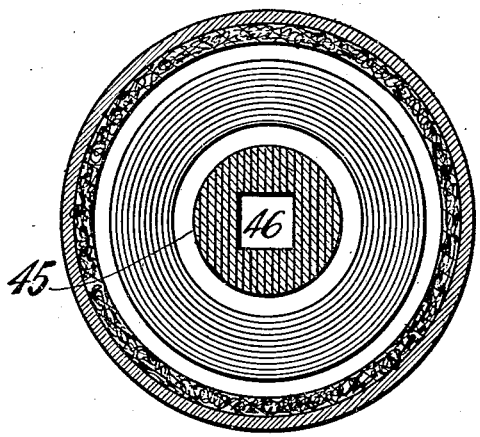
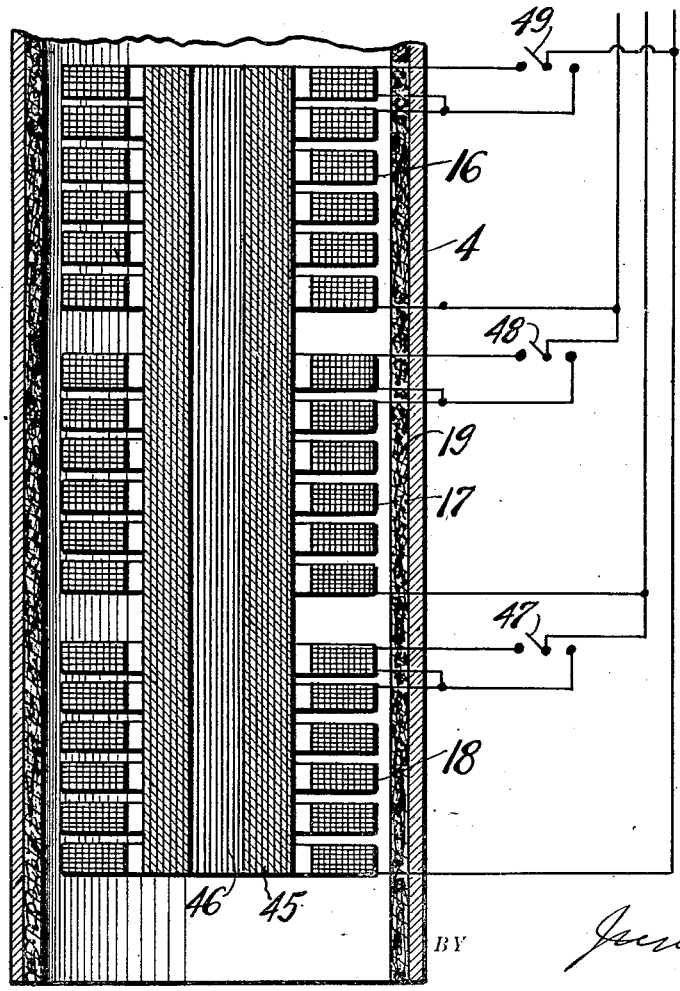
INVENTOR
ATTORNEY

UNITED STATES PATENT OFFICE 1,979,126

PROCESS OF TREATING CHEMICALS AND APPARATUS THEREFOR

Justin F. Wait, New York, N. Y.

Application September 12, 1930, Serial No. 481,574

20 Claims. (Cl. 204—31)

This invention relates to improvements in methods and apparatus for applying electricity to promote or influence chemical or physical reaction of chemical compounds. It pertains particularly to treatment of chemicals such as hydrocarbons and means for controlling and directing the application of electricity that it may perform the dual function of adding heat and influencing and/or causing direct action as by ionization of products adjacent to the surface which is so electrified or in the close proximity thereof. Such direct application may involve electric, magnetic or other effect.

Chemicals such as hydrocarbons have been heated by means of electricity which has generally been applied as by means of "space" or "bayonet" types of heaters. This method of heating involves a resistance wire or ribbon which carries an electric current and so generates heat. Such heat is then usually conducted through an insulating material and a metallic housing and into a wall of a container which is in thermal contact with the chemical to be heated or maintained at controlled temperature. By the usual manner, heat is so transferred into the hydrocarbon or other chemical for temperature control or distillation purposes and the effect is limited to that resulting from heat transfer. In isolated instances, efforts have been made to utilize alternating current of high frequency to heat the contents of a vessel and indication has been made of alteration of a substance by such treatment. My invention includes improvements over such prior art in that improved means and steps are provided to yield better results or to overcome objections to previously disclosed methods.

My invention involves the application of electricity to a member in contact with a substance to be treated. In this manner the electronic or other effect due to the passage of the electricity along the member may be caused to influence reaction with or of the substance as well as generating heat within the metallic part. If a pulsating or alternating current is applied, a voltage and hence current flow may be induced within the hydrocarbon or caused to pass through it regardless of its natural state.

The electricity may be applied directly to a metallic part or member in contact with the substance or it may be induced into the part. The form of applied electrical potential may be as desired and include static or its equivalent. A magnetic potential may be applied and under some conditions may be considered as the equivalent of an electric potential and may be used for an electronic or like effect without the generation of a large amount of heat. For some purposes one voltage may be imposed over another.

Another feature of the invention involves rapid passage of the hydrocarbon or other hydrocarbon across the electrified surface and in a manner whereby a portion is treated by such contact and again retreated similarly passing it across the surface in virtually a continuous manner and whereby for all practical purposes the substance is recirculated continuously across or about a surface.

The process preferably involves a multistage operation whereby hydrocarbons or other substances are heated indirectly so that those of high molecular weight may be kept at a lower temperature than those of less molecular weight. A hydrocarbon such as a heavy petroleum may thus be broken down in one zone into portions of lower molecular weight and then transferred into a zone of higher temperature for further breaking down with diminution in molecular weight. The second zone may involve a vapor phase reaction while the first zone is a liquid phase reaction.

The process may thus afford a means for treating a portion in one manner to produce a vaporous or other lighter product which is passed into a zone of secondary treatment which may be at an elevated temperature. The first zone may be heated at least partially by indirect transfer of heat from the electrified surface while the second zone would be acted on in a more direct manner.

My process may also involve the location of the electrified surface and/or member within a body of oil, however such member is not submerged because the effective portion is separated from the liquid oil by a vaporous film just as if the surface member were located in vapors over the surface of oil contained within a vessel. Energy may thus be transferred through a film into the liquid adjacent thereto and in a manner to cause or influence a reaction in said liquid and/or film. Portions of reacted chemical may be passed into said film.

In ordinary methods of treating of hydrocarbons for chemical change thereof, temperature and heat is used to influence or cause reactions. A reagent or a catalyst may also be used to produce the desired results. For heating purposes electricity may be applied with an intensity of from a few watts to nearly a kilowatt per square foot of surface exposed to the hydrocarbon or other substance to be treated. My process generally involves a much greater intensity of application of electricity in one of its forms. I use intensities in excess of about one kilowatt per square foot. Intensities in excess of about ten kilowatts per square foot cause ionizing and reaction conditions quite suitable for many chemical reactions of the sort indicated especially when used in combination with secondary effects obtainable at the temperatures used. The energy transmitted from an electrified surface to a contacting fluid is probably, in part at least, delivered from a zone in the close proximity of said surface rather than from the surface itself, however I consider this as being from the surface itself as it is undoubtedly associated therewith.

The induction method of applying a current makes it possible to induce a secondary voltage in a second member which may also have a surface exposed to the hydrocarbon. To members may thus act jointly and the flux passing through the substance treated may influence or cause reaction.

The operation may be such that a portion of the electric, magnetic or other current will pass through the hydrocarbon or other chemical. This will give a desired influence beyond the surface zone and may be caused to penetrate the hydrocarbon through its entire mass. The effect of heat and current passing into a chemical may be so combined. It is quite essential that like particles be treated by like methods and hence the apparatus is preferably arranged so that all of the particles pass through zones of equivalent influence. In general in the treatment of hydrocarbons which are to be cracked the heavier particles should be treated more extensively than the lighter molecular particles. Fractionation in one form or another may be used to effect concentration or separation of heavy from light portions and may be further used to insure greater action on the heavy particles.

A feature which gives unusual results with hydrocarbons such as are contained in petroleum, involves formation of a vaporous film in the close proximity of the surface. Such film yields unusual conditions and may cause changes such as ionization of component parts.

This film in contact with electrical surface causes unusual conditions which are favorable to reaction. By introducing an agent such as hydrogen or methane a hydrocarbon such as petroleum may be caused to form desired products. A component of the hydrocarbon such as carbon may be caused to contact with the electrified surface, becoming elevated in temperature and reacted as with steam forming hydrogen. Similarly sulphur may be segregated or separated from its original molecular occurrence and so rendered in a form which may be treated and/or removed with respect to other parts of the hydrocarbon.

The method of heating the liquid may thus be indirect except when heat as in the form of current is induced or applied to the outer vessel. This fact prevents undue local overheating of some portions as is the case when the heat is all applied through a surface as for example in the ordinary tube still. Such overheating is detrimental to the process and tends to form byproducts of less or no value.

My process may cause heat to be passed into and/or generated within the vapor phase. The high energy content of portions of the vapor may cause heat transfer into the surface of the surrounding liquid. This in turn may cause some evaporation and adds heat to the liquid mass and thus in some instances promotes or influences chemical reaction therein. Vapors may be formed from reacted portions of the liquid and caused to pass into the vaporous film and reacted therein under influence of an electrical phenomenon associated with the electrified surface.

Where carbon or equivalent product is set free in the reaction at the discharge zone, conditions are such as to cause such product to become heated to a higher temperature. It is thus subjected to the action of heat in a film or zone which is substantially free from liquid and wherefor the electric effect and heat effect will cooperate in causing the desired reaction. Such reaction is undoubtedly due to ionization by the conditions of the treatment and includes ionization by collision. Water vapor may be caused to react with the carbon and hydrogen so formed which is in an active state and upon contact with a hydrocarbon may combine therewith.

Centrifugal action may be combined with the electrical effect. In this manner, the combined influence of the pressure exerted by the centrifugal force of the mass itself and the influence of electricity may be realized. The centrifugal action may further cause or influence separation of portions of the treated chemical.

Nickel and other metals have been found to be catalytic in some physical and chemical reactions. In general such metals in the pure or oxide or other state have been held in contact with a chemical to be treated and the reaction brought about under elevated temperature and/or pressure. Without going into the theory or probable function of such catalysts, I accept the overall results obtained therewith in numerous reactions.

I have found that if such catalysts are electrified, the influence thereof is varied considerably and in many instances their effectiveness may be greatly increased. To this end, I apply to such a catalyst, either directly or in the close proximity thereof an electrical effect. This may be magnetic, electrostatic or otherwise in nature and should be controlled as to degree or intensity.

I have found that if electricity is applied to a chromium alloy of iron, an unusual condition is obtained which is favorable to reaction of hydrocarbon. This is apparently due to the electronic discharge and/or ionizing conditions which result when such metal is subjected to the combination of electrical discharge and heat and other phenomena which may be associated therewith. The composition of the metal probably also influences the wave length of rays discharged from the electrified and heated member and hence the effect thereof on a chemical to be reacted. Such an alloy may contain up to about between ten and thirty per cent of chromium. The addition of nickel up to about seventeen per cent favors many reactions. In addition to the applied electrical properties such metal produces very favorable secondary electrical phenomena at temperatures between about 1000° F. and 1450° F. at which my process is preferably operated and which temperatures are of a different order from that usually employed. This effect appears to be due to discharge of electrons from such metal at such temperatures which vary in nature depending upon the nature of the surrounding atmosphere of contacting materials and including the absolute pressure exerted thereon. These conditions have not heretofore been employed.

My process as applied to petroleum and coal tar products will operate with unusual results at temperatures within about the above range. It causes ionization of the particles of hydrocarbon and appears to exert pressure conditions of unusual magnitude especially when the hydrocarbon is of small dimension upon being contacted with the zone of influence about the member.

The electronic discharge and/or other electrical effect has the property of acting upon certain constituents of the hydrocarbon. For example carbon and other structures approximately atomic in size may be drawn into close proximity of the member and by virtue of its physical position it will be elevated in temperature and this fact plus the effect of the collision of the electrons and ions renders such structures very active as regards other components such as water vapor which may be introduced and caused to react therewith.

Entrained liquid particles which are mainly equivalent to tiny drops take on unusual properties including exceptionally high values of pressure. This undoubtedly assists considerably in the reaction particularly since they are under the influence of electrical effects and in the vicinity of ionized particles which are exceptionally reactive.

The process in one of its variations may be carried out in apparatus as illustrated wherein a rotating vessel is used to cause rotation of masses and to so develop centrifugal force which will influence or cause desired reaction. Fig. 1 shows a closed vessel 1 with cover 2 and special bottom 3 to which is fastened an inner shell 4. This vessel is intended to carry a mass of product, to be treated, 5 which may be charged as through line 6 and discharged as through line 7. The product is preferably caused to rotate as by means of agitator with yoke 8 and blades or arms 9 driven as by shaft 10 connected by coupling 44 with an externally driven shaft 11 operating through stuffing box 12 with gland 13 and preferably with water cooling jacket 14. Packing 15 may be used to prevent leakage as the vessel is generally under other than atmospheric pressure.

The inner shell 4 may be electrified as by placing the flat coils 16, 17 and 18 within the inner shell and insulated therefrom electrically and also thermally as by means of asbestos or other covering 19. The coils 16, 17 and 18 are shown in detail in Fig. 3. It is to be noted that the general form of coil, shown as an example, is in effect a multiplicity of turns of wire contained within a surface of controlled shape and preferably flat with somewhat rounded corners. These coils are shown as being spaced from one another and from adjacent objects. Any appropriate method of spacing may be used so long as definite passage space is provided to prevent formation of dead spaces and to permit of radiation and flow of cooling fluid which flow is preferably made positive to yield a means for controlling the maximum temperature of such coils, as protection thereof is obviously essential to continued operation. Their arrangement is novel and useful in promoting and influencing reaction and in applying heat.

Application of an alternating or pulsating current to coils 16, 17 and 18 will induce a current within the metallic inner shell 4 and a heavy current may be so caused to pass therethrough.

If the product 5 within the rotating vessel is liquid, heat will cause evaporation and centrifugal action will cause vapors to pass into the film or zone 20 at the surface of the inner shell 4, shown in Fig. 1 and in Fig. 2 which is a cross-section of Fig. 1 with rotating agitator 9 removed. The vaporous film so formed is maintained throughout reaction. Heat and electrical effect act therein and the liquid in zone 21 may also be influenced thereby.

Current flow within inner shell 4 may cause electric and/or magnetic effect within the product at zone 21. It may also induce a current within the metallic shell 1. Voltage may be applied to arms or blades 9 and other voltage of desired kind and intensity may be imposed on shells 4 and 7 and on arms 9. When voltages are applied to a metallic surface either by the inductive or other method, I consider such surfaces as electrified surfaces. These voltages are means to electrify the surface and the electrified zone is at the surface and for a short distance beyond the surface and outside the metal which is electrified by my preferred method using a high amperage so that the electrical energy is in excess of about 5 or 10 kilowatts per square foot. The electrified zone is extended beyond the immediate surface and into the surrounding fluid to a substantial distance so that a portion or all of the film of vapor is treated by the heat developed at this intensity of applied energy and under the electrical influence formed and created by the high amperage carried by the metal, of which the smooth surface is a part and which surface is preferably of circular or cylindrical shape at the zone of reaction and devoid of distending portions of the metal. These arms may carry, or have located adjacent thereto, discharge openings for introduction of a fluid. This fluid may be introduced as through an opening within the shaft 10 connecting with an outside inlet.

Hydrogen, methane, steam or other vaporous fluid may be passed into the rotating vessel as at inlets 22, 23 and 24. Nozzles as in the form of perforated holes may be placed at 25 and 26 from a "steam chest" at 27 and 28 for equalizing pressures of the vaporous fluid passing through the nozzles. Inlet 24 may be used to pass such fluid or other chemical into the film zone.

Means such as baffles 29 and 30 may be used to retard rotation and maintain a flat or curved surface such as 31. Vapors may then be caused to pass through outlet 32 to a device such as a fractionating column 33 with vapor outlet 34 to condenser 35 with cooling line 36 and 37. The condensate may flow to separator and divided-flow box 38. The backflow may pass through line 39 to column 33 and the forward flow pass as through line 40 to a receiver not shown. Uncondensed portions may pass through line 43. Drainage from the column may pass as through line 41 with seal 42 to the rotating vessel 1. A pressure control valve may be placed in line 32 and a pump in line 41 so that vessel 1 may have a pressure higher than that in column 33.

The coils 16, 17 and 18 shown in Fig. 1 and in detail in Fig. 3 may be operated as with a three phase connection as illustrated. The coils are preferably separated so as to allow cooling air to pass abstract heat therefrom. This feature is of considerable importance in view of the high temperatures ordinarily used in the process.

An iron core 45 may be used to give better electrical results. It may contain an opening 46 to provide cooling and to reduce the quantity of iron in the magnetic circuit. Such cooling may be applied in a well known manner as by flowing a nonconducting fluid, such as air, through ducts in a controlled manner so that heat generated within the windings and the core, if there be a core, may be readily abstracted and removed by the flowing fluid. The circuit may contain switches such as 47, 48 and 49 to vary the number of turns in the coils. It is to be noted that the illustration shows an induction system with a three phase primary and a single conductor as a secondary. This makes it possible to have an irregular or multiple current in a single conductor.

This method of inducing current into a heating member which surrounds the electric source gives a number of advantages. These include reduction in losses and special action of the current carried in the enveloping or surrounding member particularly noticeable at high current densities which tend to drive more of the electric effect into the space outside of and adjacent to the outer surface of the electrified member. It also causes magnetic flux to penetrate into the depth of the fluid and may induce current in the outer shell.

There are other ways in which the apparatus may be arranged and the process may be varied from that described. I do not therefore limit myself to the exact apparatus and procedure as illustrated.

I claim:

1. The process which comprises passing a current through a coil, inducing a current of high amperage in an enveloping metallic member of cylindrical shape and with a smooth external surface, generating heat therein and so promoting pyrolytic chemical reaction in a fluid hydrocarbon surrounding said member and influencing the reaction by the high current effect and while rotating the mass of hydrocarbon so as to maintain a uniform film in contact with the metallic member and excluding substantially all portions of liquid hydrocarbon from the contacting film.

2. In a vessel adapted to treat hydrocarbons, the combination of means to rotate contained masses therewithin about a substantially smooth metallic surface devoid of distending portions, coiled means to induce electric current of an energy equivalent to in excess of about 10 kilowatts per square foot of the substantially smooth surface held in contact relation with contained hydrocarbon, said current being alternating and of normal frequency, and means to vary the number of effective turns of the coiled means and so change the energy generated within the metal of the surface.

3. In a vessel adapted to the treatment of hydrocarbons, the combination of two concentric containing walls, means to rotate fluid masses contained therewithin in a manner to form a vaporous film against an internal wall which film is substantially free from liquid, concentric coils within the inner containing wall against which the film is formed by rotation and which are controlled by a multiplicity of electrical leads contacting switches adapted to vary the number of effective turns held in the circuit of current flowed by means of applied potential, and an iron-containing member situated so as to promote magnetic flow and materially raise the power factor over that which would otherwise be obtained.

4. The process which comprises heating a liquid hydrocarbon and forming vapors therefrom by transmitting heat from a hot smooth metallic surface of an electrified cylindrical shell carrying a high amperage which is controlled to yield in excess of about 5 kilowatts per square foot of smooth metallic surface and adapted to withstand a temperature of about 100° F. or more above the cracking temperature of the hydrocarbon while carrying a high amperage and transmitting heat from said cylindrical member into liquid hydrocarbon and promoting cracking therein, while rotating the masses of the liquid hydrocarbon about the cylindrical member in a manner to centrifugally exclude substantially all liquid from the smooth surface of the cylindrical member and forming a film of vapors thereat, which film is substantially free from liquid and is located between the liquid and the member that the heat passes from the member through the vapor film and to the oil to crack and vaporizes the same while the surface thereof contacting the formed film is under the influence of the electric current which electrifies the cylindrical member and influences the chemical reactions involved in cracking and attending rearrangement.

5. The process which comprises passing a hydrocarbon into a rotating vessel containing an inner shell with a smooth surface and an outer shell and provided with means for causing rotation of the mass of hydrocarbon contained therein, applying electricity of high amperage to the inner shell so that a portion of the hydrocarbon contained within the vessel will be under electrical influence while within the zone of electrification so established, elevating the temperature of the hydrocarbon to above about 1000° F. and promoting cracking and rearrangement of said hydrocarbon and altering the same chemically while under the influence of the electrified zone established by the high amperage.

6. The process which comprises passing a hydrocarbon into a rotating vessel containing an inner shell with a smooth surface and an outer shell and provided with means for causing rotation of the mass of hydrocarbon contained therein, applying electricity of high amperage to the inner shell so that a portion of the hydrocarbon contained within the vessel will be under electrical influence while within the zone of electrification so established, elevating the temperature of the hydrocarbon to above about 1000° F. and promoting cracking and rearrangement of said hydrocarbon and altering the same chemically while under the influence of the electrified zone established by the high amperage and simultaneously forming hydrogen from one portion of the hydrocarbon and adding it chemically to another portion thereof.

7. In apparatus adapted to the treatment of hydrocarbons simultaneously by pyrolysis and electricity, the combination of a still body with an internal cylindrical metallic member which member is provided with a very smooth surface and is devoid of ribbons or other distending members, means for filling the still body nearly completely with hydrocarbons and maintaining the liquid phase thereof remote from the smooth surface of the inner member and means for holding a vaporous film substantially free from liquid in contact therewith comprised of means for rotating the masses contained in the still body in a positive manner at a speed such that centrifugal force effects the formation of the vaporous film and prevents liquid from contacting the inner member in appreciable amounts throughout its regular smooth surface, means to electrify the inner member consisting of a potential and power supply which will produce therein high amperage and heat the inner member to substantially above the rearrangement temperature of pyrolysis, said current being sufficient to beneficially influence the pyrolysis and adapted to yield energy in excess of about one kilowatt per square foot, and means to charge and discharge liquids and vapors from the still body.

8. The process which comprises treating petroleum pyrolytically in one zone of treatment by contact of petroleum with an electrified metallic cylinder provided with a smooth surface and wherein a high amperage is carried to yield in excess of about ten kilowatts per square foot and forming vapors therein by combined action of heat and electricity induced in contacting fluid and separating the vapors from liquid by centrifugal force obtained by rotation of the masses about the cylinder, withdrawing separated vapors and discharging them to a point beyond the zone, separately withdrawing liquid residual to discharged vapors and flowing the liquid to a second zone of similar operation and separating and discharging centrifugally separated vapors formed therein and separately discharging residual liquid from the second zone and maintaining the two zones at a cracking temperature, the temperature of the liquid within the second zone being higher than that of the first zone.

9. In a vessel adapted to treat hydrocarbons, the combination of means to rotate contained masses therewithin about a substantially smooth metallic surface devoid of distending portions, coiled means to induce electric current of an energy equivalent in excess of about ten kilowatts per square foot of the substantially smooth surface held in contact relation with contained hydrocarbon, said current being alternating and of normal frequency, an iron core placed close to the coiled means to serve the magnetic circuit thereof, and means to vary the number of effective turns of the coiled means and so change the energy generated within the metal of the surface.

10. The process of treating an oil-like hydrocarbon which comprises passing a current through a conducting coil and substantial portions of the magnetic flux thereof through a closely located iron core, inducing a current of high amperage in a surrounding and approximately concentric metallic member possessed of a smooth external surface, so generating heat within said member and thereby promoting a desirable pyrolytic chemical reaction in liquidous and vaporous hydrocarbon held to surround the surface, and rotating the mass of hydrocarbon in a manner to form and maintain a substantially uniform vaporous film adjacent to the surface and wherein the vaporous film contains but a small volume of liquid.

11. The process which comprises passing a current through a coil, inducing a current of high amperage in an enveloping metallic member of cylindrical shape and with a smooth external surface, generating heat therein and so promoting desirable pyrolytic chemical reaction in a fluid hydrocarbon held to surround said member and influencing the reaction by the high current effect and while rotating the mass of hydrocarbons so as to maintain a uniform film in contact with the metallic member and excluding substantially all portions of liquid hydrocarbon from the contacting film and wherein liquid hydrocarbon is introduced for treatment and vaporous hydrocarbon derived therefrom is withdrawn from the film and discharged.

12. The process of beneficially treating petroleum which comprises passing a current through a layered coil, inducing a current of high amperage in an enveloping metallic member of cylindrical shape and with a smooth external surface, generating heat therein and so promoting desirable pyrolytic chemical reaction in a petroleum surrounding said member, and desirably influencing the reaction by applying the high amperage in controlled amount while rotating the mass of petroleum about the smooth surface so as to maintain a uniform thin vaporous film in contact with the metallic member and to exclude substantially all portions of liquid hydrocarbon from the contacting film, and retarding transfer of heat from said metallic member to said coil by interposing a heat transfer resistant layer, and withdrawing heat generated within the coil by flow of air through definite channels contained about and through portions of said coil and adapted to free motion of the flowing air and dissipating heat formed by the coils by flowing the so heated air to a point beyond the zone of the coils.

13. The process which comprises applying heat to petroleum to form vapors therefrom, rotating the oil and vapors rapidly about a smooth-surfaced cylindrical shell of metal to form a thin vaporous film in contact with the shell and to exclude liquid from selected portions thereof, inducing current into the shell to maintain the temperature thereof at considerably in excess of about 1000° F. and to hold the vapors at a cracking temperature and to promote rearrangement within vapors of the film with the formation of minute carbon particles, collecting portions of the particles on the heated and electrified surface and raising the temperature thereof above that of the film by contact with the hot metal surface, causing water vapors to contact the hot particles in the surface of the metal surface, causing water vapors to contact the hot particles in the surface of the metal and so promoting chemical reaction between the carbon particles and the water vapor, and avoiding the accumulation of appreciable amounts of carbon on the surface by combined action of the water vapor reaction and the velocity of vapors of the film and control of the temperature, rate of oil feed and amount of water vapor introduced into the reaction zone.

14. In an apparatus adapted to the treatment of hydrocarbons to promote chemical change thereof by pyrolysis under electrical influence, the combination of means for rotating a fluid containing the hydrocarbon about a cylinder-like metallic surface which is very smooth and substantially concentric with the rotating fluid and to form a thin vaporous film against the surface and to separate the surface from surrounding liquid, means for controlling the velocity of rotation, a metallic shell-like means for supporting and forming the surface, means for applying an electric current of high amperage to the shell and for controlling the intensity thereof, external containing means for the fluids adapted to withstand pressure, and means to charge the fluid to be treated and means to discharge treated portions.

15. In apparatus suitable for the treatment of hydrocarbons by combining pyrolysis with electrification in treatment of a vaporous film thereof, the combination of two concentric shells with ends to form a chamber the inner shell being of a true circle in form and very smooth and devoid of externally distending portions, means for rotating fluid mass contained therewithin about the smooth surface at a rate to centrifugally separate liquid fluid from gaseous fluid and to form a gaseous film against the inner shell which film is substantially devoid of liquid hydrocarbon, inductive means to apply electricity to the inner shell and to generate heat by imposing in excess of about five kilowatts per square foot of surface of most of the inner shell contacting the vaporous film and promote pyrolytic chemical reaction in the contacting gaseous film held against the electrified smooth surface, and means for charging liquid hydrocarbon and discharging gaseous hydrocarbon.

16. For the purpose of promoting chemical change in a vaporous hydrocarbon, by combined pyrolytic and electrical effect, the method of applying an induced current of very high amperage sufficient to produce an energy input in excess of about 5 kilowatts per square foot of a contacting smooth surfaced metal of circular shape, rotating vaporous hydrocarbon thereabout at high speed while maintaining the hydrocarbon under pressure, and transferring heat from the metal into the hydrocarbon, and so promoting chemical change in the hydrocarbon while the same is under the influence of the high current intensity impressed upon the smooth metal.

17. In an apparatus for promoting chemical reaction, the combination of a chamber containing an inner shell constructed of metal and with a smooth outer surface facing the chamber, means for rapidly rotating liquid and gaseous matter contained within the chamber, coils adapted to carrying alternating current placed within and approximately concentric with the metallic shell and separated therefrom by heat insulating material and an air space, means for applying alternating electric potential to the coils, said means being controllable so as to vary the potential applied to the coils, means for forcing air into the coils and across the surface thereof and means to withdraw the air after said contact, and wherein the coils are adapted to induce a high amperage into the shell, and means for introducing liquid hydrocarbon into the chamber and means for withdrawing vaporous hydrocarbon therefrom.

18. In treating hydrocarbons while rotating the masses thereof and applying heat in a manner to form a vaporous film substantially free from liquid which separates a metallic heating member from the liquid hydrocarbon, the process which comprises establishing two separate similar zones of treatment wherein the masses are rotated at high speed about a smooth surfaced metallic shell within a container to form a thin vaporous film substantially free from liquid adjacent to the surface of the shell, applying a potential to the shell so that portions of the smooth surface contacting the film are subjected to a heating effect in excess of that derived from an energy input of about 5 kilowatts per square foot and so heating the shell and the contacting vapors, at a temperature above about 1000° F., so promoting desirable pyrolytic rearrangement of the vaporous hydrocarbon and simultaneously evaporating liquid and moving vapors thereof by centrifugal action into the thin film and similarly treating such portion under the influence of the highly electrified and hot metallic surface, withdrawing vaporous hydrocarbon from the first zone wherein said treatment is carried out and separately withdrawing non-volatilized liquid hydrocarbon which is residual to the vapors from the first zone and flowing the same into a second similar zone wherein such liquid is rapidly rotated about a similar highly electrified and hot cylinder and promoting further desirable pyrolytic rearrangement to form substances which may be volatilized therein by maintenance of the film at a temperature substantially different from that of the film in the first zone of treatment, and discharging liquid residual to vapors formed in the second zone while discharging separately therefrom vapors formed in the second zone and wherein the two zones coact in pyrolytic rearrangement of the hydrocarbon charged into the first zone and which passed through the second zone.

19. In a vessel adapted to the treatment of a fluid, the combination of containing conductive walls comprised in part of iron with a relatively regular smooth circular and cylindrical surface at one section exposed to externally contained fluid, means to rotate the fluid at high velocity concentric with the circular surface, layered coiled means to induce current into a part of the regular section, similar coiled means located close thereto and adapted to induce a second current into another part of the same regular sectioned wall and to insure heating of the shell between the coils, means to apply one phase of a polyphase supply system to one coiled means, means to apply a second phase to the second coiled means, means to vary the number of effective turns in one of the coiled means, and wherein the apparatus is adapted to treat one portion of the fluid differently from that of another portion and to vary the treatment during different stages of operation.

20. In a vessel adapted to the heating of a fluid hydrocarbon, the combination of two substantially regular cylindrical and concentric metallic containing walls and coiled means to induce current flow in a section of the inner containing wall, said coiled means being formed of a multiplicity of flat thin individual coils of appropriate close spacing and thickness to accommodate suitable flow of gaseous cooling fluid therebetween and separated from said coils being separated from an inner containing wall surround the same by heat-insulating material and an air space, the air space serving to separate the coil from the heat insulating material and to provide passage for gaseous cooling fluid, a means for promoting definite velocity for gaseous cooling fluid across the flat faces of the individual coils and through the space between the coils and the heat insulating material and the space internal to the edges of these individual coils, the parts being held in such relation that the definite velocity of flow must involve radial flow across the flat surfaces of the coils so as to abstract heat therefrom while vertical motion of the gaseous fluid is within the spaces between the coils and the heat insulating material and within the passageway internal with respect to the coils, said arrangement of the passageways and means for promoting velocity being adapted to limit the operating temperature of the coils by dissipating heat therefrom to a point outside of the inner containing wall.

JUSTIN F. WAIT.